United States Patent [19]

Rollmann

[11] 3,927,171
[45] Dec. 16, 1975

[54] ZEOLITE PRODUCTION
[75] Inventor: Louis D. Rollmann, Princeton, N.J.
[73] Assignee: Mobil Oil Corporation, New York, N.Y.
[22] Filed: Mar. 29, 1974
[21] Appl. No.: 456,566

[52] U.S. Cl. ............................ 423/118; 252/455 Z
[51] Int. Cl.$^2$............................................ C01B 33/28
[58] Field of Search .................... 423/118, 329–330; 252/455 Z

[56] References Cited
UNITED STATES PATENTS

| | | | |
|---|---|---|---|
| 943,535 | 12/1909 | Gans | 423/118 |
| 3,101,251 | 8/1963 | Howell | 423/118 |
| 3,119,659 | 1/1964 | Taggart et al. | 423/118 |
| 3,431,218 | 3/1969 | Plank et al. | 252/455 Z |

Primary Examiner—Edward J. Meros
Attorney, Agent, or Firm—Charles A. Huggett; Raymond W. Barclay

[57] ABSTRACT

A process is provided for manufacture of synthetic crystalline aluminosilicate molecular sieve zeolites from montmorillonite by subjecting the same to a steam expansion activation step which comprises injection of moisture-loaded montmorillonite into a zone maintained at an initial temperature of at least about 300°C. but not in excess of about 1100°C. with subsequent immediate heating to a temperature in the approximate range of 800° to 1100°C. where said initial temperature is below 800°C. Alternatively, the activated montmorillonite product may be obtained by injection of the moisture-loaded montmorillonite into a zone maintained at a temperature of between about 800°C. and about 1100°C. to yield an activated montmorillonite product. The resulting activated montmorillonite is aged in an alkaline solution, usually an aqueous sodium hydroxide solution, for a sufficient period of time until crystals of zeolite form, which crystals are subsequently removed from the reaction mixture.

14 Claims, No Drawings

ZEOLITE PRODUCTION

BACKGROUND OF THE INVENTION

1. Field of the Invention

Process for making crystalline aluminosilicate zeolites of the molecular sieve type from steam-expanded activated montmorillonite.

2. Description of the Prior Art

It has heretofore been known to employ certain clays, principally those of the kaolin type, in synthesizing crystalline aluminosilicate zeolites as a result of treatment with caustic solution. Thus, U.S. Pat. No. 2,992,068 describes conversion of dehydrated kaolin clay by contact with a relatively concentrated caustic solution at low temperature into a type A zeolite. U.S. Pat. No. 3,037,843 describes treatment of a variety of clay minerals, particularly of the kaolin type, with caustic solution to yield a crystalline sodium aluminosilicate which is then treated with an acid to yield a "permutitic acid" which upon treatment with dilute alkali solution at an elevated temperature yields a crystalline aluminosilicate of the molecular sieve type. U.S. Pat. No. 3,114,603 describes a process which entails digesting an aqueous reactant mixture containing reactive kaolin at a temperature between about 20°C. and about 55°C. for at least 2 hours followed by crystallizing sodium zeolite A in the digested reactant mixture in the temperature range of about 75°C. to about 100°C. for at least 2 hours and recovering crystalline zeolite A as the product. U.S. Pat. No. 3,119,660 describes preparation of a molecular sieve-type crystalline aluminosilicate by contacting kaolin with an aqueous alkaline solution containing a water-soluble alkali metal salt. After a suitable period of digestion, crystallization occurs.

U.S. Pat. No. 3,338,672 describes a method for making a faujasite-type crystalline zeolite by reacting an aqueous sodium hydroxide solution with a mixture of amorphous dehydrated kaolin clays, which clays were produced by calcining kaolin clays at different temperature levels. U.S. Pat. No. 3,391,994 describes a method for producing faujasite-type zeolites by reacting sodium hydroxide solution with kaolin clay that had been calcined under conditions such that the clay had undergone the characteristic kaolin exotherm after it was dehydrated. U.S. Pat. No. 3,414,602 describes conversion of calcined kaolin by reaction with sodium hydroxide and tetramethylammonium hydroxide to yield zeolite N. U.S. Pat. No. 3,458,454 describes a procedure for providing a fluidizable cracking catalyst from calcined kaolin which is converted to pellets of precusor consisting of sodium faujasite in an amorphous matrix. Such pellets, after conversion to particle size of less than 2 microns are admixed with sodium silicate, spray dried and finally exchanged by treatment with an ammonium salt.

U.S. Pat. No. 3,367,886 relates to zeolite molecular sieve-kaolin clay composites resulting from crystallizing the zeolite molecular sieve from sources of alkali metal oxide, aluminum oxide, silicon dioxide and water in the presence of raw crystalline kaolin clay while such sources and kaolin clay are intermittently mixed together and in the form of particles of the size and shape desired in the active contact masses. U.S. Pat No. 3,367,887 describes the production of a catalyst base material obtained by hydrothermal treatment without dehydration of preformed masses of sodium hydroxide solution, calcined amorphous kaolin clays and raw crystalline kaolin clay in a manner such that the zeolite molecular sieve is produced by reaction of the caustic principally with the calcined amorphous clays in situ in the presence of the raw crsytalline kaolin clay. U.S. Pat. No. 3,508,867 describes treatment of clays with sodium hydroxide or potassium hydroxide solution, preferably in admixture with a source of silica, followed by calcination at temperatures ranging from 230°F. to 1600°F. to yield a material which is crushed, dispersed in water and digested in the resulting alkaline solution to yield, upon crystallization, a crystalline aluminosilicate. U.S. Pat. No. 3,515,511 relates to preparation of faujasite by calcining raw kaolin at a temperature in the range of 965°C. to 1095°C. to yield a reactive kaolin which upon Differential Thermal Analysis at about 980°C. exhibits an exotherm which is less than 15% of the DTA exotherm of raw kaolin and thereafter contacting the activated kaolin with sodium hydroxide solution. U.S. Pat. No. 3,515,681 and 3,515,682 describe techniques for transforming calcined kaolin into synthetic faujasite by alkaline aging in sodium hydroxide solution.

As noted, the clays previously employed for molecular sieve crystalline aluminosilicate preparation have almost invariably been of the kaolin type. Such clays have the general molar composition $Al_2O_3 \cdot 2SiO_2 \cdot xH_2O$. The $SiO_2/Al_2O_3$ ratio may, however, vary from as low as 1.8 to as high as 2.6. The kaolin-type clays may be considered as sheet-like crystalline silicates. Their basic structural unit is an aluminosilicate sheet consisting of a layer of silicon cations in tetrahedral coordination with oxygen anions, bonded to a layer of aluminum cations in octahedral coordination with oxygen or hydroxyl anions. These sheets, of approximately 7 Angstroms thickness, are stacked one on top of another to form the small plate-like crystals of the mineral. Representative of kaolin-type clays which contain the above-described two-layer sheet structure are kaolinite, levisite, nacrite, dickite, endellite and halloysite. These clays differ only in the way the basic structural sheets are stacked.

Aside from the kaolin-type clays, there are large quantities of natural clay minerals of the montmorillonite-type that have received essentially no attention as starting materials for zeolite synthesis. Those clays, also referred to as smectite or bentonite-type, are composed of units made of two silica tetrahedral sheets with a central alumina-containing octahedral sheet. In the stacking of the silica-alumina-containing-silica units, oxygen layers of each unit are adjacent to oxygens of the neighboring units with a consequence that there is a very weak bond and an excellent cleavage between them. One of the outstanding features of such structure is that water and other polar molecules can enter between the unit layers causing the lattice to expand. The montmorillonite-type clays have the general molar composition $Al_2O_3 \cdot (4-5)SiO_2 \cdot xH_2O$ and thus different from the kaolin-type clays not only in structure but also in characterizing silica/alumina mole ratio.

The lack of attention accorded clays of the montmorillonite type as sources of silica and alumina in crystalline aluminosilicate synthesis has been due, at least in part, to the high density and poor diffusion characteristics associated with these clays after calcination.

SUMMARY OF THE INVENTION

In accordance with the present invention, it has been found that montmorillonite clay can be rendered useful as a source of silica and alumina in synthesis of crystalline aluminosilicate of the molecular sieve type zeolites by alkaline aging of a steam-expanded montmorillonite. It has been found that the particular crystalline aluminosilicate zeolite obtained can be controlled by variation in the specific reaction mixture of cations and the temperature and manner of fusion. The technique described herein is especially applicable for synthesis of high silica/alumina ratio zeolites.

More particularly, the process of the present invention provides a method for employing montmorillonite clays in the synthesis of crystalline aluminosilicate zeolites of the molecular sieve type by contacting montmorillonite with an amount of water at least sufficient to saturate the same, subjecting the moisture-loaded montmorillonite suddenly to an elevated temperature of at least about 300°C. followed by calcination at a temperature in the approximate range of 800°–1100°C. or alternatively suddenly exposing the moisture-loaded montmorillonite to a temperature within said approximate range. The thus treated montmorillonite is then aged in an alkaline solution until crystals of the zeolite form and thereafter the formed crystals are removed from the reaction mixture. Without being limited by any theory, it is postulated the rapid heating of the wet montmorillonite results in a layer lattice separation not encountered in drying at a slower rate than above indicated.

The resulting product, after cooling, may be subjected to drying, calcining and steam treatment, if desired. The form of the zeolite obtained, i.e., the sodium form, may be ion exchanged, particularly when desired for use as a catalyst, with other cations such as ammonium, hydrogen, nickel, titanium, chromium, iron, manganese, vanadium, cobalt, zinc, aluminum, and the rare earths and mixtures of the foregoing ions. Ion exchange may be accomplished utilizing well-known zeolite exchange techniques, for example, such as described in U.S. Pat. Nos. 3,140,249 and 3,140,253. The product can also be impregnated with elemental metals or the oxides or sulfides of such metals to yield catalytically active contact materials useful in hydrocarbon conversion reactions such as hydrocracking, isomerization, alkylation, disproportionation and polymerization. The principal application contemplated for zeolites produced in accordance with the present invention will reside in the field of catalysis and particularly in catalytic cracking of hydrocarbon charge stocks, such as, gas oil, to lighter hydrocarbons boiling in the gasoline range.

While the steam-activated montmorillonite clay will, in accordance with the present invention, generally be the principal or sole source of silica and alumina, it is also within the purview of this invention to supplement the reaction mixture with additional sources of silica and alumina, such as, for example, sodium aluminate, silica gel and sodium silicate.

In carrying out the process of this invention montmorillonite is initially contacted with an amount of water at least sufficient to completely saturate the clay. Generally, the amount of water brought into contact with the montmorillonite will be between about 9 and about 150 percent of the weight of montmorillonite and preferably between about 10 and about 25 percent. The moisture-loaded montmorillonite is thereafter subjected to a sudden elevation in temperature under conditions such that steam is generated in situ and expansion of the so generated steam gives rise to a montmorillonite product activated towards subsequent zeolite formation. The sudden exposure of the wet montmorillonite to an elevated temperature is effected by injection into a zone maintained at a temperature of at least about 300°C. followed by immediate calcination at a temperature within the approximate range of 800° to 1100°C. and maintained at such temperature for at least about 1 hour and generally for between about 1 and about 12 hours.

The steam expanded montmorillonite product is then subjected to an alkaline aging step. Such treatment involves maintaining the steam activated montmorillonite in an aqueous alkaline solution in which the alkali is usually sodium hydroxide. A portion of the sodium hydroxide can be replaced by stoichiometrically equivalent amounts of potassium hydroxide, lithium hydroxide, aluminum hydroxide, magnesium hydroxide, or tetraalkylammonium hydroxide, either singly or in combination. It is preferred to employ an aqueous sodium hydroxide solution as the alkaline aging medium. Generally, an aqueous sodium hydroxide solution of 5% to 20% weight concentration will be employed.

Crystallization of the zeolite product is obtained by maintaining the reaction mixture comprising the steam-expanded montmorillonite and the aqueous alkaline solution at a temperature below the boiling point, generally at a temperature within the approximate range of 30° to 95°C. Preferably, the temperature will be maintained within the upper range, i.e., between about 80° and about 95°C. the zeolite crystals formed are removed from the reaction mixture by suitable means such as filtration or centrifuging. The separated zeolite product may thereafter be dried, calcined, steam-treated and/or ion exchanged, as described hereinabove.

It is contemplated that any of the naturally occurring forms of montmorillonite may be treated in accordance with the process of this invention. Thus, the montmorillonite undergoing treatment may be of the sodium or calcium form.

It is also within the purview of this invention to introduce into the mixture of montmorillonite and water, a flux material, such as, for example, sodium carbonate or sodium chloride. Such flux materials, when utilized, are added to the wet montmorillonite prior to subjecting the same to sudden heating. In addition, the designated flux materials may be useful under certain conditions, but the presence of a flux apparently had little effect on the nature of the zeolite product realized under conditions of the described sudden exposure to elevated temperature. The process of the invention is particularly applicable for the production of synthetic crystalline zeolites that are similar to the mineral faujasite, i.e., the molecular sieve type zeolites known as zeolite Y, more particularly described in U.S. Pat. No. 3,130,007; zeolite X, more particularly described in U.S. Pat. No. 2,882,244; and zeolite P, more particularly described by E. M. Flanigen and R. W. Grose, Molecular Sieve Zeolites, Vol. 101, Amer. Chem. Soc., Washington, D.C., 1971, page 76.

Crystallization from the reaction mixture may be controlled to yield a substantially 100% conversion to the desired crystalline aluminosilicate zeolite. Alternatively, and more commonly, however, crystallization from the reaction mixture will be such as to yield a product which is an admixture of the previously steam-expanded montmorillonite and the crystalline aluminosilicate molecular sieve type zeolite.

In a preferred embodiment, the synthesis of zeolites in varying proportion in intimate mixtures with the montmorillonite clay gives rise to a product characterized by excellent attrition resistance. The manner and degree of interaction between steam-expanded montmorillonite clay and alkaline solution can be used to control the ratio between montmorillonite and crystalline aluminosilicate produced. Thus, at sodium hydroxide concentrations substantially below 5 weight percent, crystallization to zeolite may not occur. At sodium hydroxide concentration substantially above 20%, crystallization may proceed to undesirable, dense structures such as sodalite.

The treatment above described in providing crystalline aluminosilicate of the molecular sieve type appears to be confined to montmorillonite clays. As hereinafter shown, comparable treatment of kaolinite under the process conditions of the invention did not provide a feasible method for synthesizing crystalline aluminosilicate molecular sieve zeolites.

DESCRIPTION OF SPECIFIC EMBODIMENTS

The following examples will serve to illustrate the process of the invention without limiting the same:

EXAMPLE 1

Thirty grams of sodium montmorillonite having the following composition:

|  | Weight Percent |
| --- | --- |
| $SiO_2$ | 67.6 |
| $Al_2O_3$ | 19.7 |
| Na | 1.3 |
| K | 0.42 |
| Mg | 1.9 |
| Ca | 1.2 |
| Fe | 2.5 |
| Remainder | 5.38 |
| Ash | 86.0 | were contacted with an equal weight of water. The resulting mixture was dried at 110°C. for about one hour until it flowed freely (10–15 percent moisture) and was thereafter placed directly in an oven maintained at 400°C. The temperature was raised to 910°–950°C. over about two hours.

The resulting material was then cooled, finely ground to less than 100 mesh and aged in a 3 molar sodium hydroxide solution at 85°–90°C. for two to three days, at the end of which time crystals, after separation from the reaction mixture, established the same as a crystalline aluminosilicate zeolite comprising a mixture of synthetic faujasite and zeolite P.

EXAMPLE 2

Another sample of the sodium montmorillonite used in Example 1 in an amount of 15 grams was treated with an equal weight of water. The resulting mixture was dried at 110°C. for about 1 hour until it flowed freely and then subjected to additional drying at such temperature for 1 hour to give a product containing 7–8 percent moisture. Thereafter, the sample was placed in an oven at 200°C. and the temperature was raised to 910°–950°C. over about 2 hours. After aging in sodium hydroxide solution as in Example 1, no zeolite crystallization was observed, establishing the necessity of sudden heating of the moisture-laden montmorillonite to achieve desired zeolite crystal formation.

EXAMPLE 3

Thirty grams of calcium montmorillonite having the following composition:

|  | Weight Percent |
| --- | --- |
| $SiO_2$ | 74.7 |
| $Al_2O_3$ | 15.7 |
| Na | 0.21 |
| K | 0.05 |
| Mg | 2.1 |
| Ca | 1.2 |
| Fe | 0.50 |
| Remainder | 5.54 |
| Ash | 84.1 | was contacted with an equal weight of water. The resulting mixture was dried at 110°C. for about 1 hour until it flowed freely (15–20% moisture) and was thereafter placed directly in an oven maintained at 400°C. The temperature was raised to 910°–950°C. over about 2 hours.

The resulting material was then cooled, finely ground to less than 100 mesh and aged in a 3 molar sodium hyroxide solution at 85°–90°C. for 2 to 3 days, at the end of which time crystals had formed. Analysis of the crystals, after separation from the reaction mixture established the same as a crystalline aluminosilicate zeolite having the structure of zeolite P.

EXAMPLE 4

Another sample of the calcium montmorillonite used in Example 3 in an amount of 15 grams was treated with an equal weight of water. The resulting mixture was dried at 110°C. for about 1 hour until it flowed freely and then subjected to additional drying at such temperature for one hour to give a product containing 7–8 percent moisture. Thereafter, the sample was placed in an oven at 200°C. and the temperature raised to 910°–950°C. over about 2 hours. After aging as in Example 3, no zeolite crystallization was observed, again showing the necessity of sudden heating of the moisture-containing montmorillonite to achieve desired zeolite crystal formation.

EXAMPLE 5

Thirty grams of kaolinite clay having the following composition:

|  | Weight Percent |
| --- | --- |
| $SiO_2$ | 51.9 |
| $Al_2O_3$ | 39.4 |
| Na | 0.03 |
| K | 0.23 |
| Mg | 0.02 |
| Ca | 0.03 |
| Fe | 1.1 |
| Remainder | 7.3 |
| Ash | 85.5 | were combined with 40 cc of water, air-dried, and thereafter placed in an oven at 400°C. The temperature was then raised to 910°–950°C. over about 2 hours.

The resulting material was then cooled, finely ground, and a five-gram sample was aged in a 3 M aqueous sodium hydroxide solution at 85°–90°C. for 3 days. At the end of this time, no formation of crystalline aluminosilicate zeolite was observed, establishing the necessity of utilizing montmorillonite as the starting clay.

EXAMPLE 6

The procedure of Example 5 was repeated with a 15 gram sample of the kaolinite clay except that the air-dried, moisture-laden clay was placed in an oven at 200°C.

Again, no zeolite was observed after sodium hydroxide aging.

EXAMPLE 7

The procedure of Example 1 was repeated except that a flux in the form of sodium carbonate solution in an amount equivalent to 6.6% $Na_2O$ was added to the sodium montmorillonite.

The zeolite product obtained in this instance was a mixture of synthetic faujasite and zeolite P, i.e. just as was obtained for Example 1, showing that the addition of a flux had little effect on the nature of the zeolite product realized under conditions of sudden heating.

EXAMPLE 8

The procedure of Example 3 was repeated except that a flux in the form of sodium carbonate solution as used in Example 7 was added to the calcium montmorillonite.

The zeolite product obtained in this instance was zeolite P, i.e. the same as that obtained for Example 3, again showing that the addition of a flux had little effect on the nature of the zeolite product realized under conditions of sudden exposure of the moisture-loaded montmorillonite to elevated temperature.

I claim:

1. The process for manufacture of a synthetic crystalline aluminosilicate molecular sieve zeolite which comprises contacting montmorillonite with an amount of water between about 9 and about 150 percent of the weight of montmorillonite, injecting the moisture-loaded montmorillonite into a zone maintained at an initial temperature of at least about 300°C. but not in excess of about 1100°C. with subsequent immediate heating to a temperature in the approximate range of 800° to 1100°c. where said initial temperature is below 800°C., maintaining the montmorillonite at a temperature within said approximate range of 800° to 1100°C. for at least about 1 hour, aging the thus treated montmorillonite in an alkali metal hydroxide solution until crystals of said zeolite form and removing said crystals from the reaction mixture.

2. The process for manufacture of a synthetic crystalline aluminosilicate molecular sieve zeolite which comprises contacting montmorillonite with an amount of water between about 9 and about 150 percent of the weight of montmorillonite, effecting sudden exposure of the moisture-loaded montmorillonite to a temperature of between about 800°C. and about 1100°C. for at least about 1 hour, aging the thus treated montmorillonite in an alkali metal hydroxide solution until crystals of said zeolite form and removing said crystals from the reaction mixture.

3. The process of claim 1 wherein said zeolite is zeolite P.

4. The process of claim 1 wherein the amount of said water is between about 10 and about 25 percent of the weight of montmorillonite.

5. The process of claim 1 wherein said aging is at a temperature between about 30°C. and about 95°C.

6. The process of claim 1 wherein said alkali metal hydroxide solution is a solution of sodium hydroxide.

7. The process of claim 6 wherein the concentration of sodium hydroxide is between about 5 and about 20 weight percent.

8. The process of claim 1 wherein the montmorillonite is sodium montmorillonite.

9. The process of claim 1 wherein the montmorillonite is calcium montmorillonite.

10. The process of claim 1 wherein said zeolite is synthetic faujasite.

11. The process of claim 2 wherein said aging is at a temperature between about 30°C. and about 95°C.

12. The process of claim 2 wherein said montmorillonite is maintained at a temperature in the approximate range of 800° to 1100°C. for a period of between about 1 and about 12 hours.

13. The process of claim 2 wherein said alkali metal hydroxide solution is a solution of sodium hydroxide.

14. The process of claim 13 wherein the concentration of sodium hydroxide is between about 5 and about 20 weight percent.

* * * * *